(12) United States Patent
Handa et al.

(10) Patent No.: US 8,099,771 B2
(45) Date of Patent: Jan. 17, 2012

(54) METHOD FOR ISSUING IC CARD STORING ENCRYPTION KEY INFORMATION

(75) Inventors: Fukio Handa, Tokyo (JP); Yoshihiro Yano, Tokyo (JP); Takayuki Chikada, Tokyo (JP); Syouzou Niwata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/111,586

(22) Filed: May 19, 2011

(65) Prior Publication Data

US 2011/0222686 A1    Sep. 15, 2011

Related U.S. Application Data

(62) Division of application No. 11/579,080, filed as application No. PCT/JP2005/008656 on May 2, 2005.

(30) Foreign Application Priority Data

May 6, 2004    (JP) .................................. 2004-137192

(51) Int. Cl.
*H04L 9/14*    (2006.01)
*H04L 9/12*    (2006.01)
*H04L 29/06*    (2006.01)

(52) U.S. Cl. ............................................. 726/9; 380/44
(58) Field of Classification Search ......... 726/9; 380/44
See application file for complete search history.

(56) References Cited

U.S. PATENT DOCUMENTS

| | | | | |
|---|---|---|---|---|
| 5,003,596 | A | * | 3/1991 | Wood .............................. 380/28 |
| 5,309,516 | A | | 5/1994 | Takaragi et al. |
| 5,841,866 | A | * | 11/1998 | Bruwer et al. .................. 705/66 |
| 6,058,477 | A | | 5/2000 | Kusakabe et al. |
| 6,351,813 | B1 | | 2/2002 | Mooney et al. |
| 6,487,659 | B1 | | 11/2002 | Kigo et al. |
| 6,490,680 | B1 | | 12/2002 | Scheidt et al. |
| 6,769,608 | B2 | | 8/2004 | Nishimura |
| 7,606,557 | B2 | * | 10/2009 | Park et al. ..................... 455/410 |
| 2002/0027494 | A1 | | 3/2002 | Watanabe et al. |
| 2003/0196106 | A1 | | 10/2003 | Erfani et al. |
| 2007/0165860 | A1 | * | 7/2007 | Handa et al. .................. 380/259 |

FOREIGN PATENT DOCUMENTS

| | | |
|---|---|---|
| JP | 01-233851 A | 9/1989 |
| JP | 09-106445 A | 4/1997 |
| JP | 9-167220 A | 6/1997 |
| JP | 10-327142 A | 12/1998 |

* cited by examiner

*Primary Examiner* — Matthew Henning
(74) *Attorney, Agent, or Firm* — Ladas & Parry LLP (57) ABSTRACT

It is possible to issue an IC card storing unique encryption key information in such a manner that re-issuing is enabled and sufficient security can be assured. An IC card provider X delivers an IC card having a group code G(A) to a company A and an IC card having a group code G(B) to a company B. When a company staff α inputs a unique personal code P(α) and performs initialization, in the IC card, calculation is performed according to a predetermined algorithm using the P(α) and G(A). Data uniquely determined by the calculation is stored as encryption key information K(α) in the IC card. Even if the company staff α loses the IC card, it is possible to obtain the IC card having the same encryption key information K(α) as before by performing initialization again by using the IC card delivered by the IC card provider X.

4 Claims, 5 Drawing Sheets

METHOD FOR ISSUING IC CARD STORING ENCRYPTION KEY INFORMATION

RELATED APPLICATION

This application is a divisional of application Ser. No. 11/579,080 filed on Oct. 30, 2006, now abandoned, which is an application under 35 U.S.C. 371 of International Application No. PCT/JP2005/008656 filed on May 2, 2005, the entire contents of which are incorporated herein by reference.

TECHNICAL FIELD

The present invention relates to a method for issuing IC cards storing encryption key information, and particularly relates to a method for respectively issuing a plurality of IC cards, each storing unique encryption key information, to specific individuals belonging to specific groups.

BACKGROUND ART

IC cards are used in various applications as portable information recording media of extremely high confidentiality and recently many companies distribute multifunctional IC cards, serving as company staff ID cards at the same time, to their respective company staff. There are also many examples, where such confidentiality is noted and an IC card is used as a storage medium for storing key data which is used to encrypt and decrypt information. Often in a general encryption method, a secret encryption key or encryption key table (here, these shall be referred to collectively as "encryption key information") is used as a seed in an encryption algorithm. In an encryption process of converting predetermined plaintext data into encrypted text data, a process using this secret encryption key information is executed. In this case, the secret encryption key information used in the encryption process becomes an essential element for a decryption process of restoring the encrypted text data to plaintext data. That is, the decryption cannot be performed as long as the secret encryption key information is not provided. Thus by storing this secret encryption key information in an IC card, access of the encryption key by an illicit means is made extremely difficult and security of the encrypted text itself can be improved.

In general, decryption of encrypted text should be permitted only to a person permitted by the person who carried out the encryption, and the encryption key information must be unique data that differs for each individual. Thus in an multifunctional IC card that serves in common as a company staff ID card, a unique encryption key information is determined for each company staff, and in the process of issuing the IC cards, a process of storing this unique encryption key information in each IC card is performed. The IC cards issued to the respective company staff are thus put in a state of storing unique encryption key information that differ from each other. Because as mentioned above, the encryption key information is a secret key code used by a processor in an encryption process and a decryption process, it is data that even the company staff who owns the IC card does not normally need to know and is maintained as secret data inside the IC card.

In issuing such IC cards storing encryption key information, an issuing process that takes security into adequate consideration is required to prevent leakage of the encryption key information. Thus a method has been proposed in which, when an IC card is issued, encryption key information itself is sent into the IC card in an encrypted state and is decrypted and stored inside the IC card.

As mentioned above, the encryption key information stored inside an IC card should essentially be handled as secret data that not even the person who owns the IC card knows and is ideally data that exists only inside the IC card and is preferably data that nobody can know of. For example, by making a code, generated randomly using random numbers inside the IC card, be stored as it is as encryption key information inside an IC card, information that nobody can know of is stored as the encryption key information in just the IC card.

However for practical use, such an ideal method cannot be employed since there is a need to leave open a way of reissuing an IC card. As mentioned already, in order to perform a process of decrypting encrypted data using specific encryption key information, the same encryption key information as that used for encryption is necessary. Thus when an IC card is lost or the IC card is damaged by any chance, unless an IC card storing the same encryption key information can be reissued, data that had been encrypted in the past can never be decrypted again. Thus for practical use, a method is often employed in which the same information as the encryption key information stored inside the IC card is stored somewhere externally to enable reissuing of an IC card, and when reissuing must be performed, the externally stored encrypted key information is written into a new IC card.

Such a method of storing encryption key information outside of an IC card does not present a problem under the premise that the storage is implemented under strict management by a trustworthy manager. However, in terms of practical use, problems of not being able to ensure sufficient security arise. Normally when a company distributes IC cards that function as company staff ID cards to respective company staff, the company generally requests an IC card provider (such as a major printing company) to perform the IC card procurement and issuing tasks. In this case, the management of the encryption key information of each individual company staff must be entrusted to the IC card provider. Even if the task of storing encryption key information for reissuing is to be performed in the company itself, as long as at least the process of issuing the individual IC cards is entrusted to the IC card provider, the data of the encryption key information according to each individual company staff must be handed over to the IC card provider at the time of issuing.

As a matter of course, an IC card provider handles the data of the encryption key information of each individual company staff provided from a client company under adequate consideration so that thorough security can be ensured. However, that a person who will commit an illicit act absolutely does not exist among company staff involved in an IC card issuing task cannot be guaranteed. Also, because an IC card provider generally receives orders from a plurality of clients, there is a possibility for encryption key information concerning company staff of a client company A to be handed over to a company staff of another client company B due to some form of negligence, even if it is not intentional.

An object of the present invention is thus to provide a method for issuing IC cards containing encryption key information that enables an issuing process to be carried out in a mode enabling reissuing and yet enabling the ensuring of sufficient security in cases where plurality of IC cards, each storing unique encryption key information, are respectively issued to specific individuals belonging to specific groups.

DISCLOSURE OF INVENTION (1) The first feature of the present invention resides in a method for issuing a plurality of IC cards, each storing unique encryption key information, to specific individuals belonging to specific groups, the method comprising the steps of:

preparing IC cards, each having a CPU, a memory, and an I/O unit, which performs transaction of information with respect to the exterior, and having stored in the memory, a key information generating program, which, by performing a calculation process based on a predetermined algorithm using at least two pieces of data, generates encryption key information that is uniquely determined by the two pieces of data;

defining a secret group code for each group, and writing the secret group code, defined for a group to which an individual, to whom an IC card is to be issued, belongs, into the memory of each prepared IC card;

writing a predetermined secret personal code, designated by an individual to whom an IC card is to be issued, into the memory of each prepared IC card; and making the CPU execute the key information generating program to generate encryption key information using at least the two pieces of data of the secret group code and the secret personal code and store this encryption key information into the memory of each IC card.

(2) The second feature of the present invention resides in a method for issuing IC cards storing encryption key information having the first feature, wherein an encryption key itself, which is used for encryption or decryption, is generated as the encryption key information.

(3) The third feature of the present invention resides in a method for issuing IC cards storing encryption key information having the first feature, wherein a key table, a portion of which is used as an encryption key used for encryption or decryption, is generated as the encryption key information.

(4) The fourth feature of the present invention resides in a method for issuing IC cards storing encryption key information having the third feature, wherein two codes are written as secret personal codes, a first key table is generated based on a first secret personal code and a secret group code, a second key table is generated based on a second secret personal code and a secret group code, the two key tables are stored in each IC card as encryption key information, and an encryption key, used in encryption or decryption, is enabled to be obtained by synthesizing a portion of the first key table and a portion of the second key table.

(5) The fifth feature of the present invention resides in a method for issuing IC cards storing encryption key information having any of the first to the fourth features, wherein a routine, which, when the key information generating program is executed on an IC card for a predetermined number of times, records an instruction prohibiting subsequent execution of the program in the IC card, and a routine, which, when the instruction is recorded, prohibits the execution of the program, are included in the key information generating program.

(6) The sixth feature of the present invention resides in a method for issuing IC cards storing encryption key information having any of the first to the fifth features, wherein each secret group code is managed so as to be in a state in which it can be known only by a manager not belonging to any group, or only by a manager belonging to a corresponding group, or only by a manager not belonging to any group and a manager belonging to a corresponding group, and each secret personal code is managed so as to be in a state in which it can be known only by a corresponding individual.

(7) The seventh feature of the present invention resides in an IC card issued by the IC card issuing method having any of the first to the fifth features.

(8) The eighth feature of the present invention resides in a key information generating program used in the IC card issuing method having any of the first to the fifth features.

(9) The ninth feature of the present invention resides in an IC card, used for executing an encryption process or a decryption process using unique encryption key information, the IC card comprising:

a CPU, a memory, and an I/O unit performing transaction of information with respect to the exterior;

there being stored in the memory, a program for performing a process of storing encryption key information generating data, provided from the exterior, into a first storage location and a second storage location, respectively, inside the memory, a program for performing a calculation process based on a predetermined algorithm using a first data stored in the first storage location and a second data stored in the second storage location to generate encryption key information that is uniquely determined according to the two pieces of data and storing the encryption key information in the memory, and a program for executing the encryption process or the decryption process inside the IC card using the encryption key information.

(10) The tenth feature of the present invention resides in an IC card, used for executing an encryption process or a decryption process using unique encryption key information, the IC card comprising:

a CPU, a memory, and an I/O unit performing transaction of information with respect to the exterior;

there being stored in the memory, a program for performing a process of storing encryption key information generating data, provided from the exterior, into a first storage location and a second storage location, respectively, inside the memory, a program for performing a calculation process based on a predetermined algorithm using a first data stored in the first storage location and a second data stored in the second storage location to generate encryption key information that is uniquely determined according to the two pieces of data and storing the encryption key information in the memory, and a program for reading out the encryption key information or a portion thereof for execution of the encryption process or the decryption process outside the IC card.

With the present invention's method for issuing IC cards storing encryption key information, the encryption key information is prepared using the secret group code and the secret personal code in the interior of an IC card and is stored as it is in the IC card. Here, the secret group code is a code defined for a group to which an individual, to whom the IC card is issued, belongs, and this code can be put in the custody, for example, of a manager of an IC card provider. Meanwhile, the secret personal code is a code designated by the individual to whom the IC card is issued, and this code can be put in the custody of the individual him/herself. Because neither the secret group code nor the secret individual code is the encryption key information in itself, the encryption key information inside the IC card is maintained in a state of being stored without being known to anyone. When the IC card is lost or damaged by any chance, the IC card can be reissued because, by inputting the secret group code, kept in the custody of the manager, and the secret personal code, kept in the custody of the individual, into a new IC card, the same encryption key information can be prepared in the interior of the IC card again. The present invention thus enables an issuing process to be carried out in a mode enabling reissuing and yet enabling the ensuring of sufficient security in cases where plurality of IC cards, each storing unique encryption key information, are respectively issued to specific individuals belonging to specific groups.

BEST MODE FOR CARRYING OUT THE INVENTION

The present invention shall now be described based on an illustrated embodiment.

<<<Section 1. General IC Card Storing Encryption Key Information>>>

Figure 1:
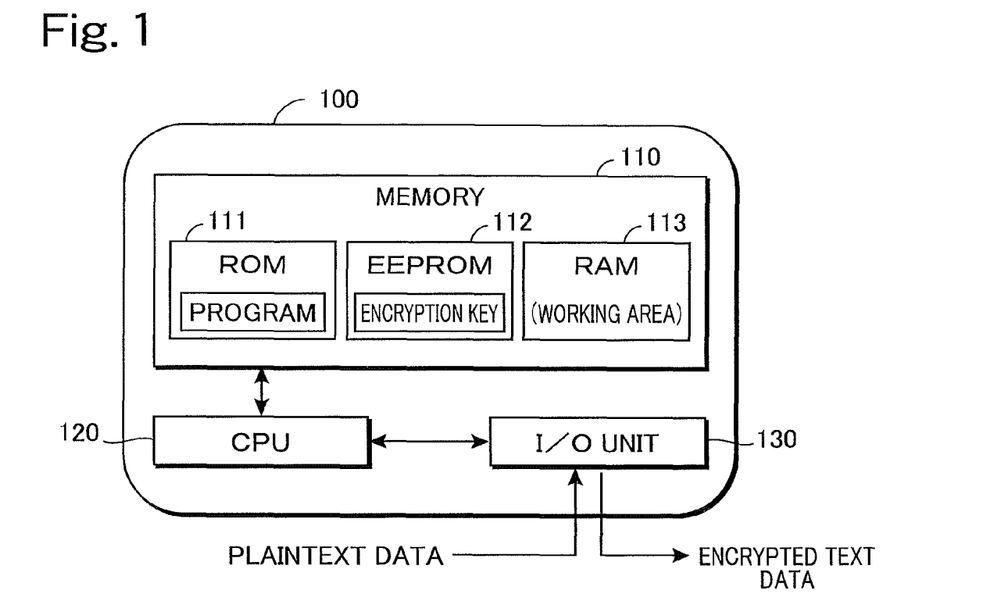
FIG. 1 is a block diagram for describing an arrangement of a general IC card that is widely used presently and an encryption process using this IC card.

First, an arrangement of a general IC card that stores encryption key information and a mode of use of this IC card shall be described briefly. FIG. 1 is a block diagram for describing an arrangement of a general IC card 100 that is widely used presently and an encryption process using this IC card 100. As illustrated, this IC card 100 has a memory 110, a CPU 120, and an I/O unit 130. In this illustrated example, memory 110 is arranged from a ROM 111, which is a non-rewritable, nonvolatile memory, an EEPROM 112, which is a rewritable, nonvolatile memory, and a RAM 113 which is a rewritable, volatile memory. Programs for executing various processing functions that IC card 100 is equipped with are stored in ROM 111, and various data to be recorded in IC card 100 are stored in EEPROM 112. RAM 113 is used as a working area when CPU 120 executes various processes.

Memory 110 is accessible only by CPU 120, and memory 110 cannot be accessed directly from the exterior. Access from the exterior is carried out via I/O unit 130. That is, commands provided from the exterior via I/O unit 130 are executed by CPU 120 based on programs inside ROM 111, and CPU 120 returns execution results as responses to the exterior via I/O unit 130. The illustrated example is an example of an IC card having functions of executing an encryption process of converting plaintext data to encrypted text data and executing an opposite decoding process of converting encrypted text data to plaintext data, and a program for carrying out the encryption and decryption are stored in ROM 111 and an encryption key used by this program is stored in EEPROM 112.

When a predetermined encryption command and plaintext data are provided to IC card 100 via I/O unit 130, CPU 120 executes the provided encryption command based on the program inside ROM 111 and thereby performs a process of applying the predetermined encryption process to the provided plaintext data and outputting the obtained encrypted text data along with a response to the exterior via I/O unit 130. In performing this encryption process, the encryption key stored in EEPROM 112 is used. Oppositely when a predetermined decryption command and encrypted text data are provided to IC card 100 via I/O unit 130, CPU 120 executes the provided decryption command based on the program inside ROM 111 and thereby performs a process of applying the predetermined decryption process to the provided encrypted text data to restore the original plaintext data and outputting the plaintext data along with a response to the exterior via I/O unit 130. The encryption key stored in EEPROM 112 is also used when this decryption process is performed. Here, unless the same key as the encryption key used in the encryption process is used, the plaintext data cannot be restored correctly.

Though an example in which the encryption and decryption program is prepared in ROM 111 was described above, this program may be prepared in EEPROM 112 instead. When the encryption and decryption program is prepared in EEPROM 112, this processing program can be rewritten as necessary. Also, though for the sake of description, IC card 100 having just the encryption and decryption process functions is described here, because IC card 100 is used for various applications, programs for executing the various processes of these various applications are stored in ROM 111 or EEPROM 112 for practical use.

Figure 2:
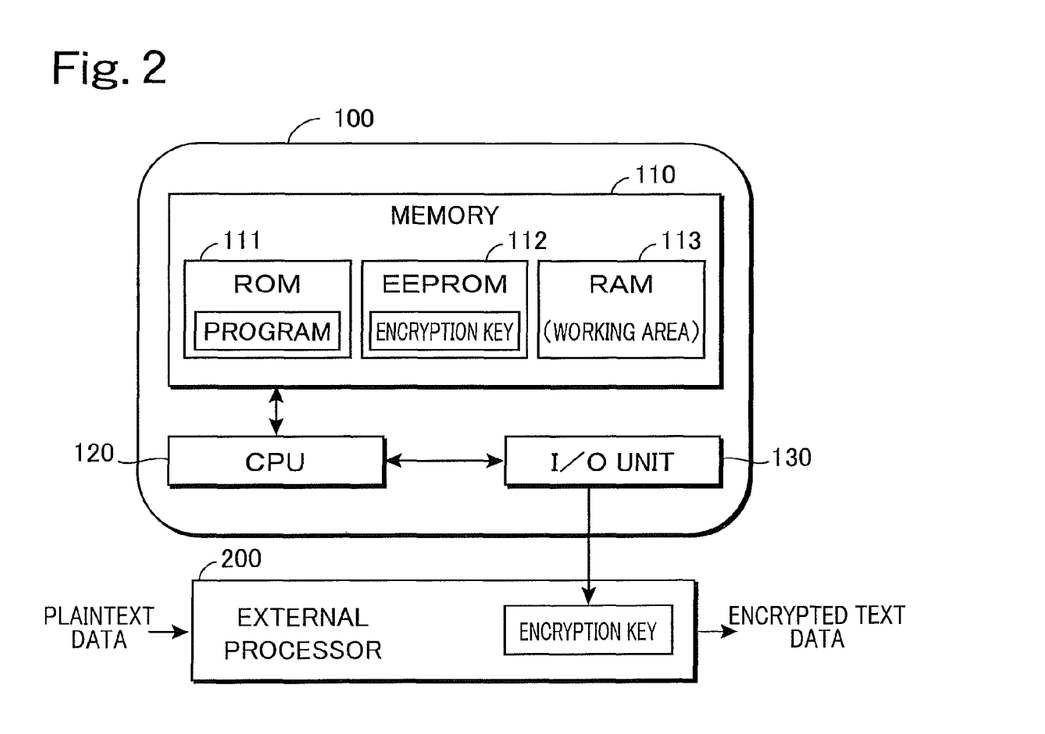
FIG. 2 is a block diagram of an embodiment, with which encryption and decryption processes are carried out not in the interior of an IC card 100 but in an external processor 200.

FIG. 2 is a block diagram of an embodiment, with which the encryption and decryption processes are carried out not in the interior of IC card 100 but in an external processor 200. In this example, when plaintext data is provided to external processor 200, it is converted to and output as encrypted text data, and oppositely when encrypted text is provided, it is converted to and output as plaintext data. In such a case where the encryption and decryption processes are carried out by external processor 200, the encryption key stored in EEPROM 112 is read to external processor 200 via I/O unit 130. The program for encryption and decryption is prepared in external processor 200 and this program executes the encryption and decryption processes using the encryption key read from IC card 100.

Because the encryption key stored in EEPROM 112 is read out to the exterior of IC card 100 with the embodiment shown in FIG. 2, the embodiment of FIG. 1 is better from the standpoint of security. With the embodiment of FIG. 1, because the encryption key stored in EEPROM 112 is not read out to the exterior of IC card 100, the possibility that the encryption key will be made known by an illicit means is extremely low after the encryption key has been stored in EEPROM 112.

Figure 3:
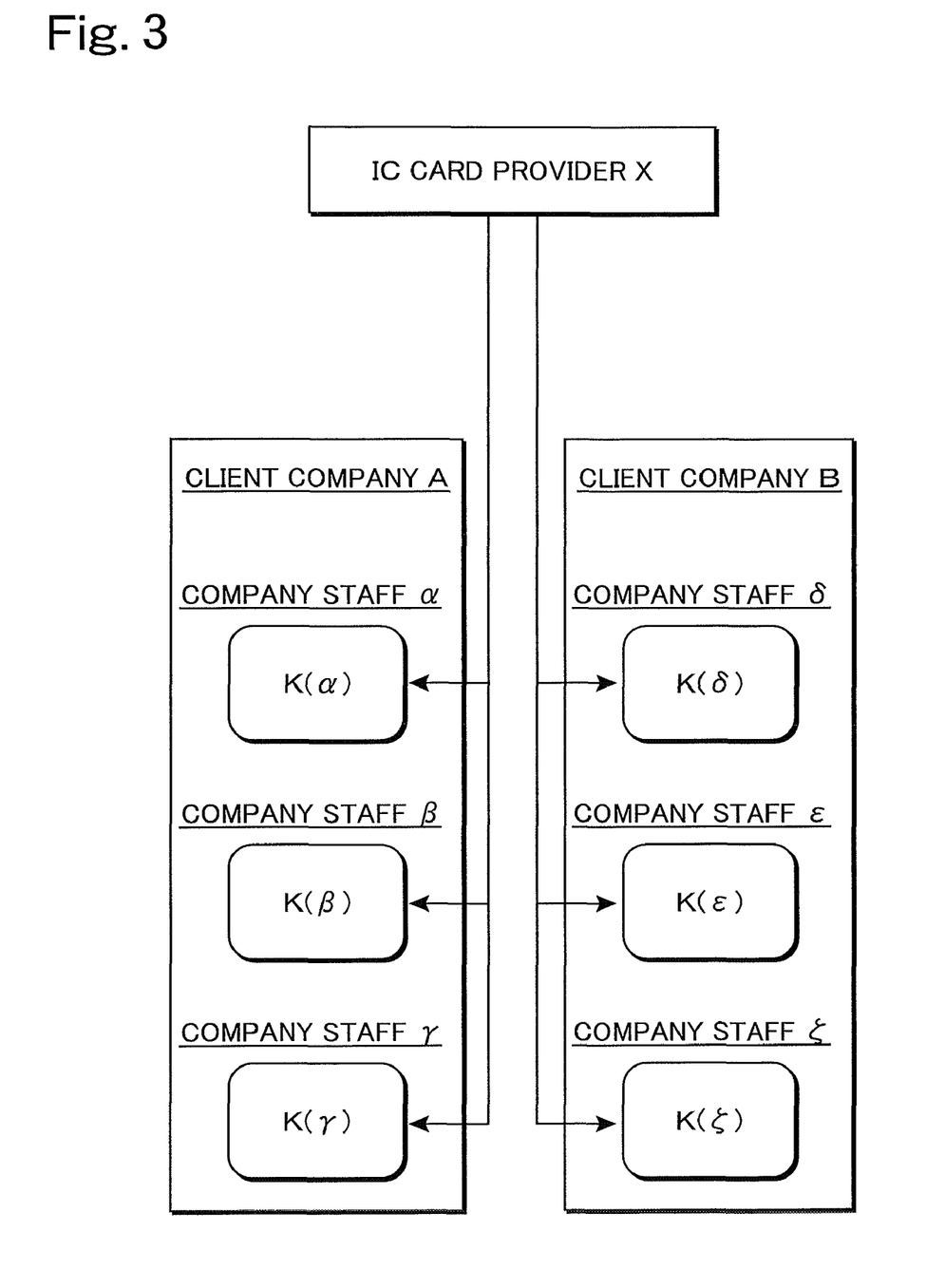
FIG. 3 is a block diagram of a manner in which an IC card provider X issues IC cards, each functioning as a company staff ID card, to respective company staff belonging to a client company A and a client company B.

A case where such IC cards, each storing an encryption key for performing encryption and decryption processes, are issued as company staff ID cards shall now be considered. As mentioned above, normally when a company distributes IC cards that function as company staff ID cards to respective company staff, the company generally requests an IC card provider (such as a major printing company) to perform the IC card procurement and issuing tasks. FIG. 3 is a block diagram of a manner in which an IC card provider X issues IC cards, each functioning as a company staff ID card, to respective company staff belonging to a client company A and a client company B. Though here, an example where IC cards, each storing a unique encryption key, are issued as company staff ID cards to three company staff α, β, and γ, belonging to client company A, and three company staff δ, ε, and ζ, belonging to client company B, shall be described for the sake of convenience, in practical use, IC cards are issued to a larger number of company staff and also a larger number of client companies exist.

The encryption keys stored in the respective IC cards are unique keys that differ from each other. In the illustrated example, unique encryption keys $K(\alpha)$, $K(\beta)$, $K(\gamma)$, $K(\delta)$, $K(\epsilon)$, and $K(\zeta)$ are stored in IC cards issued to company staff $\alpha$, $\beta$, $\gamma$, $\delta$, $\epsilon$, and $\zeta$, respectively. In a case where IC cards storing such unique encryption keys are issued, conventionally, these encryption key data are generally prepared by IC card provider X and a process of writing the individual encryption keys into the individual IC cards is performed at the time of issue. And in consideration of the convenience of reissue, the encryption key data are kept in custody by IC card provider X or kept in custody by management staff of client company A and client company B. In any case, because as long as the IC card issuing task is entrusted to IC card provider X, the encryption key data must be provided to the IC card provider X side, the possibility of leakage of the encryption keys due to an illicit act or negligence on the part of IC card provider X cannot be denied. The possibility that someone who will commit an illicit act exists in client company A or client company B also cannot be denied. Encryption keys used for encryption and decryption processes inherently should be managed under tight security so that such leakage will not occur.

As a method of preventing such leakage, there is a method of making random encryption keys be generated using random numbers inside the individual IC cards and storing the encryption keys as they are in the IC cards. However with this method, if an IC card is lost or damaged by any chance, because the encryption key is then lost forever and the IC card cannot be reissued, it becomes impossible to decrypt data that had been encrypted in the past. The present invention provides an IC card issuing method that enables sufficient security to be ensured and yet enable reissuing.

<<<Section 2. Basic Embodiment of the Invention>>>

Figure 4:
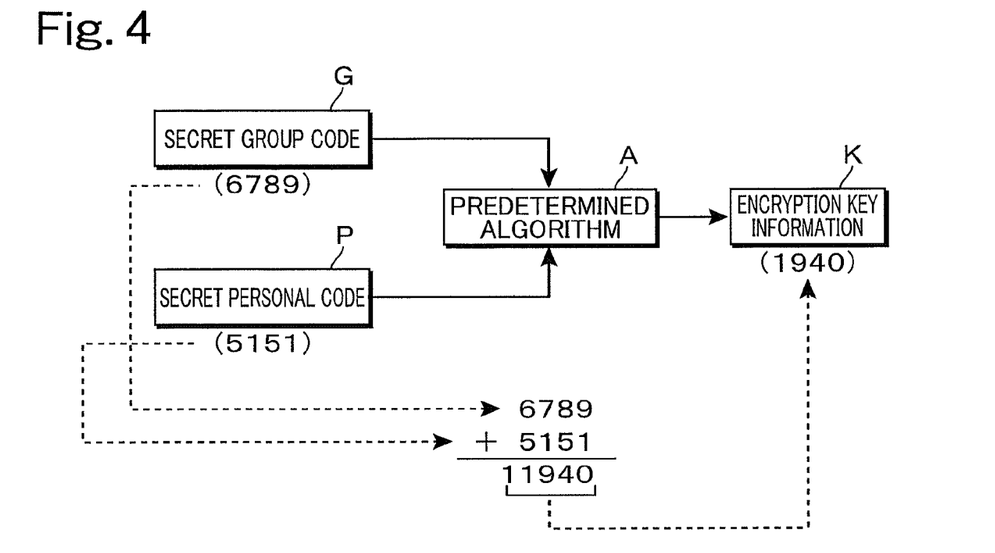
FIG. 4 is a block diagram of a processing process of a key information generating program prepared in an IC card according to the present invention.

FIG. 4 is a block diagram of a processing process of a key information generating program prepared in an IC card according to the present invention. The key information generating program used in the present invention has a function of performing a calculation process based on a predetermined algorithm using at least two pieces of data to generate encryption key information (encryption key) that is uniquely determined according to the two pieces of data. FIG. 4 shows an example where an encryption key information K is generated as a result of using the two pieces of data of a secret group code G and a secret personal code P and executing a calculation process based on a predetermined algorithm A. The significances of secret group code G and secret personal code P and the differences between the two shall be described later.

Though any algorithm may be used as the predetermined algorithm A, a simple algorithm, in which the sum of secret group code G, which is a four-digit numeral, and secret personal code P, which is likewise a four digit numeral, is determined and the lower four digits of this sum is used as encryption key information K, is shown as an example in the FIGURE. For example if secret group code G is the numeral, "6789," and secret personal code P is the numeral, "5151," encryption key information K that is the numeral, "1940," is generated as illustrated. By employing such an algorithm, when two pieces of data G and P are provided, encryption key information K that is determined uniquely according to these two pieces of data can be generated.

The algorithm for generating encryption key information K is not necessarily restricted to a calculation process based on two pieces of data, and as long as at least the two pieces of data of secret group code G and secret personal code P are used and encryption key information K that is uniquely determined according to these two pieces of data is obtained, the algorithm may be a calculation using a third piece of data or a fourth piece of data.

By thus arranging encryption key information K to be generated by an algorithm using the two pieces of data of secret group code G and secret personal code P, the request of ensuring sufficient security and the request of enabling reissuing of the IC card can both be met. That is, in regard to ensuring sufficient security, because the two codes of secret group code G and secret personal code P are necessary to obtain encryption key information K and encryption key information K cannot be generated with just one of either code, if secret group code G and secret personal code P are respectively kept in separate management environments, the possibility of acquiring encryption key information K by an illicit method can be reduced significantly. Meanwhile, because as long as the two codes of secret group code G and secret personal code P are available, encryption key information K can be generated at any time as information that is determined uniquely based on the two codes, the IC card can be reissued in case of an emergency.

Figure 5:
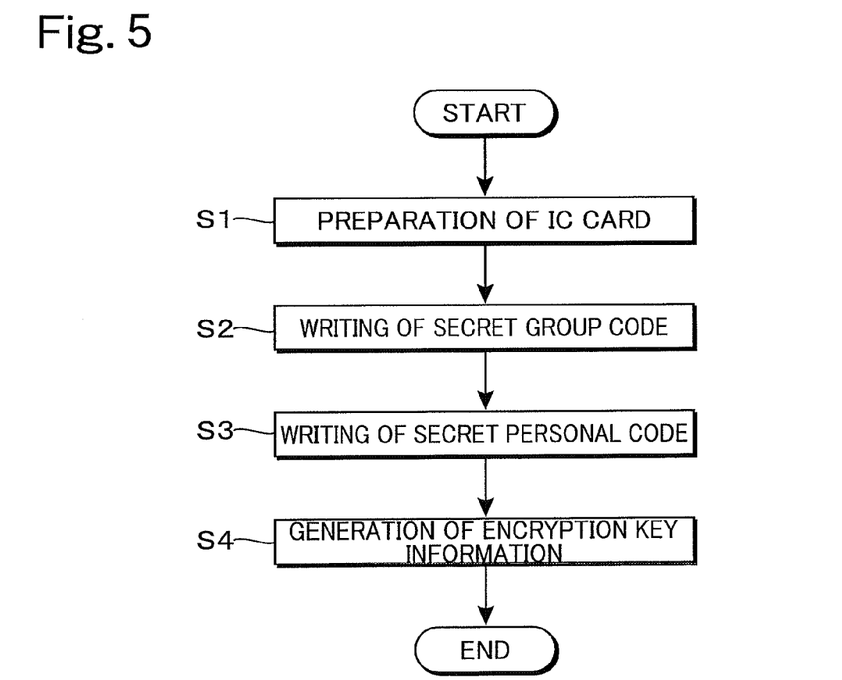
FIG. 5 is a flow diagram of basic procedures of an IC card issuing method according to the present invention.

FIG. 5 is a flow diagram of basic procedures of an IC card issuing method according to the present invention. First in step S1, an IC card of an arrangement shown in FIG. 1, that is, an IC card, having memory 110, CPU 120, and an I/O unit 130 that performs transaction of information with the exterior, is prepared. Moreover, a program for executing the encryption key information generating process shown in FIG. 4 is prepared inside memory 110. That is in step S1, an IC card is prepared in which is stored the key information generating program that performs the calculation process based on a predetermined algorithm using at least two pieces of data to generate encryption key information that is uniquely determined according to the two pieces of data.

In step S2 that follows, the writing of a secret group code G is performed, and in step S3, the writing of a secret personal code P is performed. These writing processes are actually performed by providing, to IC card 100, data to be written along with a predetermined write command. Then in the last step S4, a process of generating encryption key information K is performed. That is, the process shown in FIG. 4 is executed in the interior of IC card 100, and the generated encryption key information K is written and stored as it is into EEPROM 112. This encryption key information K generating process is actually performed by providing an execute command, for making the key information generating program be executed, to IC card 100.

The writing processes of steps S2 and S3 may be performed on EEPROM 112 or on RAM 113. However, since RAM 113 is a volatile memory, if a step in which the supply of power to IC card 100 is stopped temporarily is carried out before the execution of step S4, writing into EEPROM 112, which is a nonvolatile memory, must be performed.

An embodiment, in which the issuing method according to the present invention is applied to the specific example shown in FIG. 3, shall now be described with reference to the block diagram of FIG. 6. As mentioned above, this is an example in which IC card provider X that has been commissioned by client company A and client company B issues IC cards, respectively storing unique encryption keys $K(\alpha)$, $K(\beta)$, $K(\gamma)$, $K(\delta)$, $K(\epsilon)$, and $K(\zeta)$ to company staff $\alpha$, $\beta$, $\gamma$, $\delta$, $\epsilon$, and $\zeta$.

First, IC card provider X defines secret group codes G respectively according to the companies. In the illustrated example, a secret group code G(A) is defined for client company A and a secret group code G(B) is defined for client company B. These codes G(A) and G(B) may be any codes as long as the codes differ from each other. Also, though not illustrated, if there is a third client company C, a fourth client company D, etc., different secret group codes G(C), G(D), etc., are defined respectively for these companies as well. Thus in the present invention, a secret group code is a unique code that is provided in common to a single group.

Though an example where one company is handled as one group shall be described here, a department or a section within the same company may also be handled as one group. In this case, mutually different secret group codes are allocated according to the departments or sections, to which the staff belong, even if the departments or sections are of the same company. Oppositely, a plurality of companies may be handled together as one group.

Figure 6:
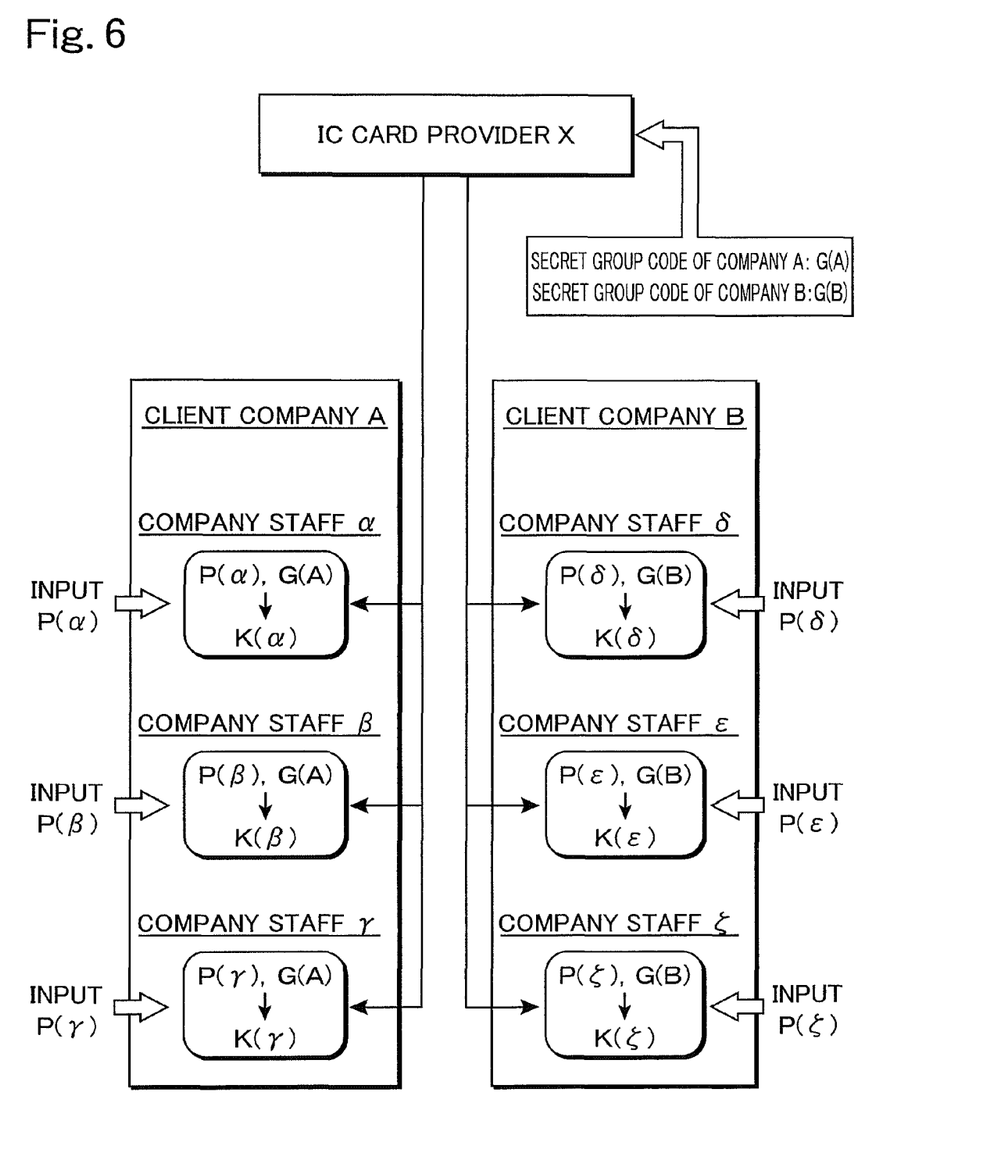
FIG. 6 is a block diagram of an embodiment, in which the issuing method according to the present invention is applied to the specific example shown in FIG. 3.

In step S2 of FIG. 5, the writing of the secret group code into each IC card is performed, and in the case of the embodiment shown in FIG. 6, this process is carried out as a task, in which, the process of writing secret group code G(A) into IC cards to be delivered to client company A and the process of writing secret group code G(B) into IC cards to be delivered to client company B are performed at IC card provider X. Thus in the case of the embodiment shown in FIG. 6, IC card provider X delivers three IC cards, into which secret group code G(A) has been written, to client company A and delivers three IC cards, into which secret group code G(B) has been written, to client company B.

Though the processes of steps S1 and S2 of the first half of FIG. 5 are thus processes carried out at IC card provider X, the processes of steps S3 and S4 of the latter half of FIG. 5 are processes that are carried out at the respective client companies A and B. For examples, since three IC cards, into each of which secret group code G(A) has been written, are delivered to client company A, a company staff of client company A distributes these IC cards to the respective company staff $\alpha$, $\beta$, and $\gamma$ and instructs each of these company staff to execute a predetermined initialization process on their own to initialize the IC cards. Steps S3 and S4 of FIG. 5 are executed in this initialization process. That is, company staff $\alpha$, $\beta$, and $\gamma$ respectively perform the process of writing unique secret personal codes P($\alpha$), P($\beta$), and P($\gamma$) into their own IC cards and thereafter provide, to the IC cards, an execution command for making the key information generating program be executed to thereby perform the process of making encryption key information K($\alpha$), K($\beta$), and K($\gamma$) be generated inside the respective IC cards by using secret group code G(A) and secret personal codes P($\alpha$), P($\beta$), and P($\gamma$), which the company staff have written in on their own, and making the encryption key information be stored as they are in EEPROMs 112 inside the IC cards.

Thus after the above-described initialization process has been executed, unique encryption key information K($\alpha$), K($\beta$), and K($\gamma$) are respectively stored in the IC cards owned by company staff $\alpha$, $\beta$, and $\gamma$, respectively, and can be used in encryption and decryption processes. Likewise, because three IC cards, into which secret group code G(B) has been written, are delivered to client company B, company staff $\delta$, $\epsilon$, and $\zeta$ can respectively obtain IC cards, respectively having encryption key information K($\delta$), K($\epsilon$), and K($\zeta$) stored therein by performing the process of writing unique secret personal codes P($\delta$), P($\epsilon$), and P($\zeta$) into their own IC cards and thereafter providing the execution command for making the key information generating program be executed.

In executing the above-described initialization process, a computer, which is equipped with an IC card reader/writer device and in which a specialized initialization program is incorporated, is preferably prepared. Specifically, arrangements are made so that when a company staff inserts his/her own IC card into the reader/writer device of the computer and executes the initialization program, a message urging the input of secret personal code P is displayed on a screen of the computer, and when the company staff inputs an arbitrary code as secret personal code P, the command for performing the process of writing (step 3 of FIG. 5) this arbitrary code into the IC card is provided to the IC card and then the command for performing the process (step 4 of FIG. 5) of executing the key information generating program is provided to the IC card.

As can be understood from the embodiment shown in FIG. 6, whereas secret group code G, used in the present invention, is a code that is defined for a group (each company in the case of the illustrated example) to which individuals (the respective company staff in the case of the illustrated example), to whom IC cards are issued, belong, secret personal code P is a code designated by an individual, to whom an IC card is issued. Such use of two types of codes is thus extremely convenient in cases where a plurality of IC cards, each storing unique encryption key information, are to be issued respectively to specific individuals belonging to specific groups.

With the example shown in FIG. 6, for example, a manager of IC card provider X (in other words, a manager not belonging to either of groups A and B) keeps and manages secret group codes G(A) and G(B). Though these codes are essential for generating the respective encryption key information, the actual entities thereof are not the encryption key information itself but are what should be called secret codes that are provided to the respective individual groups, and thus the abovementioned manager has no way of knowing what sort of data the encryption key information, stored in the IC cards to be carried by the individual company staff belonging to companies A and B, are. In other words, the contents that the manager of IC card provider X can know of are limited to the fact that secret group code G(A) is written into the IC cards shipped to client company A and secret group code G(B) is written into the IC cards shipped to client company B. Thus even if by a fault on the part of IC card provider X, these secret group codes G(A) and G(B) are leaked, a critical situation in terms of security protection will not occur.

The secret group codes may instead be kept and managed by company staff of the respective client companies. For example, secret group code G(A) may be kept and managed by a company staff of client company A and secret group code G(B) may be kept and managed by a company staff of client company B so that IC card provider X is not involved whatsoever in the custody and management of these codes. Obviously, the codes may be kept and managed by both company staff of client companies A and B and a manager of IC card provider X.

Meanwhile, each secret personal code P is preferably managed so that only the corresponding individual knows of it. For example, secret personal code P($\alpha$) concerning company staff $\alpha$ is a code that company staff $\alpha$ has input in performing the initialization process on his/her own IC card and can be made a secret code that is known only to $\alpha$. However, since this secret personal code P is essential for reissuing the IC card in case of emergency, the secret personal code input in the initialization process is preferably a code that will never be forgotten and is preferably recorded as a confidential note if possible.

As mentioned above the advantage of the present invention is that while ensuring sufficient security concerning encryption key information stored in individual IC cards, reissuing of the IC cards is enabled in case of emergency. For example, when company staff α loses or damages his/her IC card, he/she will not be able to restore any data that have been encrypted in the past unless he/she uses the IC card. In such a case, company staff α can acquire a reissued IC card by simply having IC card provider X deliver a new IC card and performing the initialization process using the same secret personal code P(α) used before. In this case, because IC card provider X performs a delivery to client company A, the IC card is delivered with secret group code G(A) written therein. Thus as long as company staff α performs the initialization process using the same secret personal code P(α) as before, the same encryption key information K(α) as before becomes stored inside the reissued IC card and restoration of data that had been encrypted in the past is thus enabled.

<<<Section 3. Modification Examples of the Invention>>>

The illustrated basic embodiment of the present invention was described above, and some modification examples of the present invention shall now be described.

(1) Example of Using an Encryption Key Table

Though an example, in which an encryption process and a decryption process are performed using an encryption key stored in an IC card, is illustrated in FIG. 1 and FIG. 2, the "encryption key information" in the present invention refers not only to such an encryption key, used in encryption and decryption, itself but refers to a broad concept including a key table, a portion of which is used as an encryption key in encryption and decryption.

Figure 7:
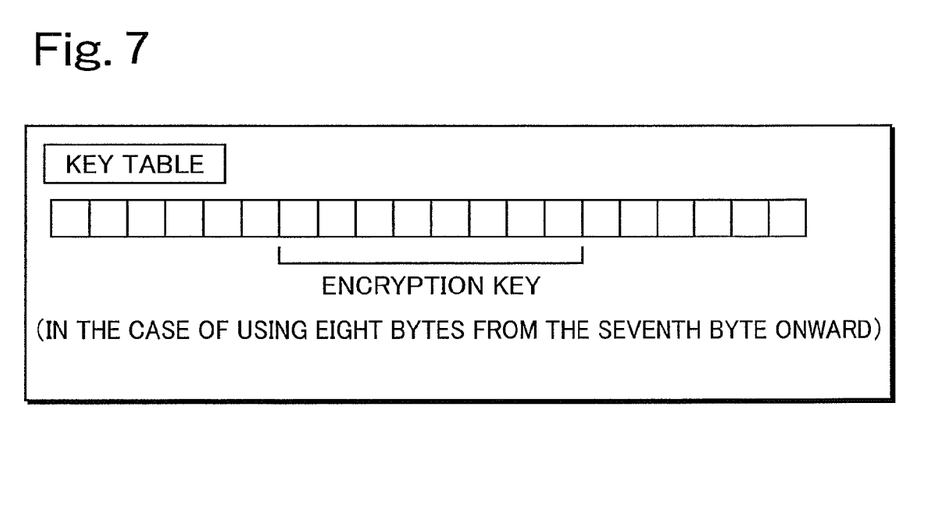
FIG. 7 is a diagram of concepts of a key table used for encryption and decryption processes.

FIG. 7 is a diagram of concepts of such a key table. In the illustrated example, one grid block indicates one byte of data, and the key table is formed by a data string of a total of 20 bytes. By storing such a key table as encryption key information in an IC card, a desired portion of the key table can be extracted and used as necessary as an encryption key, and the key table can thus be used as an encryption key with a plurality of variations. For example, if in the encryption process, encryption is executed upon providing an instruction to "use eight bytes from the seventh byte onward as the encryption key," just the designated portion is extracted from the key table as in the illustrated example and used as the encryption key. Because in decrypting data encrypted by such a method, the same instruction to "use eight bytes from the seventh byte onward as the encryption key," which was used in the encryption process, must be provided to specify the encryption key, the security can be improved further.

Encryption key information K used in the present invention is data generated by the processing process shown in FIG. 4, and by suitably setting the number of digits of secret group code G and the number of digits of secret personal code P, or employing a specific algorithm as algorithm A, encryption key information K with an arbitrary number of digits can be generated. Encryption key information generated by the present invention can thus sufficiently be used as the above-described key table.

(2) Example of Using Two Key Tables

Figure 8:
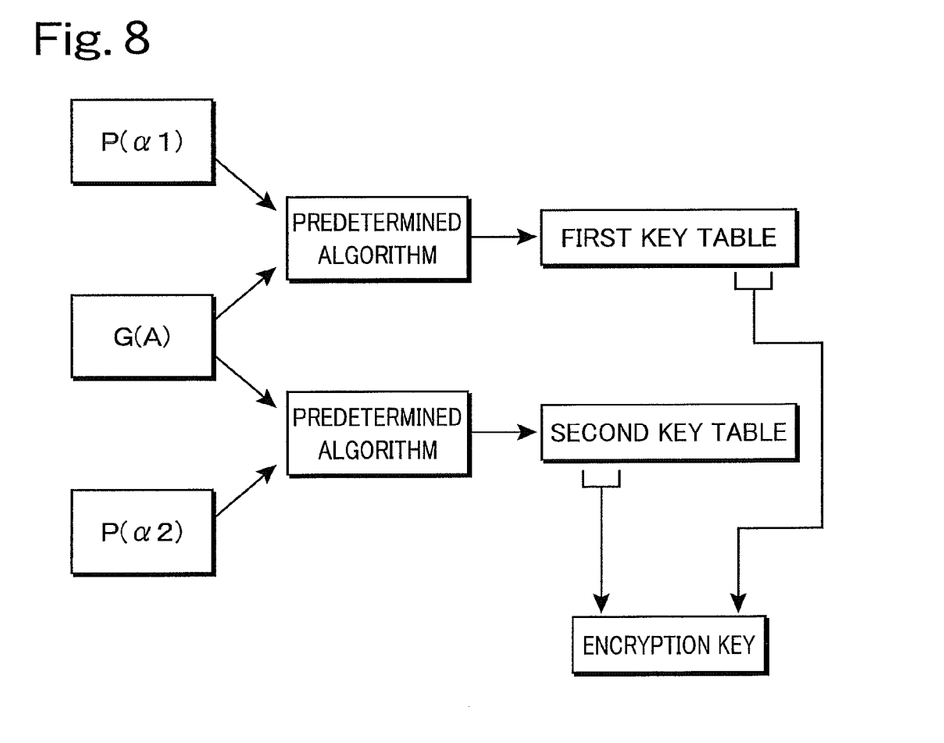
FIG. 8 is a diagram of a developed mode using two of the key tables shown in FIG. 7.

A modification example shown in FIG. 8 is a more developed mode using two of the above-described key tables. In this modification example, two codes are written as secret personal codes in step S3 of FIG. 5. Then in step S4, a process of generating a first key table, based on a first secret personal code and the secret group code, generating a second key table, based on a second secret personal code and the secret group code, and storing these two key tables as the encryption key information inside the IC card is performed. When two key tables are thus stored as the encryption key information, the security can be improved further because the encryption key used for encryption or decryption can be obtained by synthesizing a portion of the first key table and a portion of the second key table.

With the specific example shown in FIG. 8, company staff α inputs two secret personal codes P(α1) and P(α2). Because secret group code G(A) concerning client company A is already stored inside the IC card, the first key table can be generated by performing calculation based on a predetermined algorithm on secret personal code P(α1) and secret group code G(A), and the second key table can be generated by performing calculation based on a predetermined algorithm on secret personal code P(α2) and secret group code G(A). Then in step S4, the process of storing these two key tables as they are inside IC card is performed.

Here, in performing the encryption process, for example, an instruction to "use the result of joining four bytes from the third byte onward of the second key table to four bytes from the 14th byte onward of the first key table as the encryption key" is provided to execute the encryption process. Because the existence of two key tables in the IC card is an essential requirement in such a mode of use, the security is improved further.

(3) Example of Restricting the Execution of the Encryption Key Information Generating Process to a Predetermined Number of Times As described above, the process of step S4 of FIG. 5, that is, the encryption key information generating process is carried out by providing a predetermined command to the IC card to make the key information generating program, incorporated in ROM 111 (or EEPROM 112), be executed. Normally, the same command can be provided any number of times to the IC card, and as long as a program corresponding to the provided command is prepared in a memory, this program can be executed any number of times.

However, from the standpoint of ensuring security, the execution of the key information generating program is preferably restricted to a predetermined number of times (for example, once). This is because, if an IC card is to be issued by a legitimate method, the process of the key information generating program is a process that suffices to be executed once (or a number of times in consideration of mistakes) in the above-described initialization process and is not a process that needs to be executed repeatedly. Meanwhile, if the IC card is put in the hands of an illicit user, this illicit user may rewrite the secret group code and secret personal code by an illicit means and repeatedly execute the key information generating program to analyze the key information generating algorithm, etc. In consideration of this point, it is reasonable to restrict the execution of the key information generating program to just a predetermined number of times.

For practical use, a routine, which records, into the IC card (for example, into EEPROM 112), an instruction that prohibits further execution of the key information generating program when the program has been executed on the IC card for just the predetermined number of times, and a routine, which prohibits execution when the above instruction is recorded, are included in the key information generating program prepared inside the IC card.

The invention claimed is:

1. A method for executing an encryption/decryption process using IC cards issued to specific individuals belonging to specific groups, respectively, said IC cards having a CPU, a memory and an I/O unit performing transaction of information with respect to the exterior and having stored in the memory, a key information generating program, which, by performing a calculation process based on a predetermined algorithm using at least two pieces of data, generates encryption key information that is uniquely determined by the two pieces of data and an encryption/decryption program for carrying out a process for executing an encryption/decryption process using said encryption key information inside or outside the IC cards, said method comprising an issuing process and an encryption/decryption process:

said issuing process comprising, a step in which the CPU writes a secret group code, defined for a group to which an individual, to whom the IC card is to be issued, belongs, into the memory based on a write command provided from the exterior via the I/O unit, a step in which the CPU writes a first secret personal code and a second secret personal code, designated by an individual to whom the IC card is to be issued, into the memory based on a write command provided from the exterior via the I/O unit, and a step in which the CPU generates a first key table based on the first secret personal code and the secret group code, and a second key table based on the second secret personal code and the secret group code, by executing said key information generating program, and writes both of the key tables as encryption key information into the memory, and said encryption/decryption process comprising, a step in which the CPU generates an encryption key, used in encryption or decryption, based on a command provided from the exterior via the I/O unit, said encryption key is obtained by synthesizing a portion of the first key table and a portion of the second key table by executing said encryption/decryption program, and a step in which the CPU executes an encryption/decryption process using said encryption key or outputs said encryption key to the outside, by executing said encryption/decryption program.

2. The method for executing an encryption/decryption process using IC cards issued according to claim 1, wherein a routine, which, when being executed on an IC card for a predetermined number of times, records an instruction prohibiting subsequent execution in the IC card, and a routine, which, when the instruction is recorded, prohibits the subsequent execution, are included in the key information generating program.

3. An IC card, used for executing an encryption process or a decryption process using unique encryption key information, the IC card comprising:

a CPU, a memory, and an I/O unit performing transaction of information with respect to the exterior;

there being stored in the memory, a program for performing a process of storing encryption key information generating data, provided from the exterior, into a first storage location, a second storage location and a third storage location, respectively, inside the memory, a program for generating a first key table by performing a calculation process based on a predetermined algorithm using a first data stored in the first storage location and a second data stored in the second storage location, said first key table being uniquely determined according to the first data and the second data, and storing said first key table in the memory as encryption key information, a program for generating a second key table by performing a calculation process based on a predetermined algorithm using a first data stored in the first storage location and a third data stored in the third storage location, said second key table being uniquely determined according to the first data and the third data, and storing said second key table in the memory as encryption key information, a program for generating an encryption key, used in encryption or decryption, by synthesizing a portion of the first key table and a portion of the second key table, and a program for executing the encryption process or the decryption process inside the IC card using said encryption key.

4. An IC card, used for executing an encryption process or a decryption process using unique encryption key information, the IC card comprising:

a CPU, a memory, and an I/O unit performing transaction of information with respect to the exterior;

there being stored in the memory, a program for performing a process of storing encryption key information generating data, provided from the exterior, into a first storage location, a second storage location and a third storage location, respectively, inside the memory, a program for generating a first key table by performing a calculation process based on a predetermined algorithm using a first data stored in the first storage location and a second data stored in the second storage location, said first key table being uniquely determined according to the first data and the second data, and storing said first key table in the memory as encryption key information, a program for generating a second key table by performing a calculation process based on a predetermined algorithm using a first data stored in the first storage location and a third data stored in the third storage location, said second key table being uniquely determined according to the first data and the third data, and storing said second key table in the memory as encryption key information, a program for generating an encryption key, used in encryption or decryption, by synthesizing a portion of the first key table and a portion of the second key table, and a program for reading out said encryption key for execution of the encryption process or the decryption process outside the IC card.

* * * * *